United States Patent
Hindy (10) Patent No.: US 9,266,463 B2
(45) Date of Patent: Feb. 23, 2016

(54) DEVICE, SYSTEM, AND METHOD FOR LIMITING MOVEMENT OF A CARGO CONTAINER IN A CARGO AREA

(71) Applicant: Abdelrazak Hindy, Raynham, MA (US)

(72) Inventor: Abdelrazak Hindy, Raynham, MA (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 0 days.

(21) Appl. No.: 14/295,982

(22) Filed: Jun. 4, 2014

(65) Prior Publication Data
US 2015/0352998 A1    Dec. 10, 2015

(51) Int. Cl.
*B60P 7/08* (2006.01)
*B64D 9/00* (2006.01)

(52) U.S. Cl.
CPC .............. *B60P 7/0892* (2013.01); *B64D 9/003* (2013.01)

(58) Field of Classification Search
CPC .............................. B60P 7/0892; B64D 9/003
USPC ............... 410/77, 78, 80, 90, 91, 94, 95, 121, 410/153, 155, 89; 244/118.1, 137.1
See application file for complete search history.

(56) References Cited

U.S. PATENT DOCUMENTS

| | | |
|---|---|---|
| 3,906,870 A | 9/1975 | Alberti |
| 4,132,326 A | 1/1979 | Pinto |
| 4,134,345 A | 1/1979 | Baldwin et al. |
| 5,785,471 A | 7/1998 | Godbersen |
| 6,002,350 A | 12/1999 | Checa et al. |
| 6,129,195 A | 10/2000 | Matheny |
| 6,890,138 B1 | 5/2005 | Myrick |
| 7,530,774 B2 * | 5/2009 | Roberts ................. B60P 7/0892 410/69 |
| 8,491,239 B2 | 7/2013 | Ferrari |
| 2006/0090981 A1 | 5/2006 | Clos et al. |
| 2012/0101636 A1 | 4/2012 | Huber et al. |
| 2012/0163941 A1 | 6/2012 | Dugic |

FOREIGN PATENT DOCUMENTS

| | | |
|---|---|---|
| DE | 10 2011 113 863 A1 | 1/2013 |
| EP | 1 481 844 A1 | 12/2004 |
| EP | 2 444 320 A2 | 4/2012 |
| FR | 2580736 A1 | 10/1986 |

OTHER PUBLICATIONS

International Search Report and Written Opinion issued Aug. 21, 2015, in corresponding PCT Application No. PCT/US2015/033673.

\* cited by examiner

*Primary Examiner* — Stephen Gordon
(74) *Attorney, Agent, or Firm* — Finnegan, Henderson, Farabow, Garret & Dunner, L.L.P.

(57) ABSTRACT

An immobilizing device for limiting movement of a cargo container in a cargo area may include a tubular member configured to be inserted into an aperture of a cargo deck. The immobilizing device may further include a stop member extending at least partially across a hollow interior of the tubular member, wherein the stop member is configured such that extension of the tubular member into the aperture is limited by contact between the stop member and the portion of the cargo deck located in the aperture. The immobilizing device may also include an extension associated with the tubular member and configured to engage a lower edge of the cargo container, such that movement of the cargo container is limited upon receipt of the tubular member in the aperture and engagement between the extension and the lower edge of the cargo container.

19 Claims, 9 Drawing Sheets

DEVICE, SYSTEM, AND METHOD FOR LIMITING MOVEMENT OF A CARGO CONTAINER IN A CARGO AREA

FIELD OF THE DISCLOSURE

This disclosure relates to a device, system, and method for limiting movement of a cargo container, in particular, a device, system, and method for limiting movement of a cargo container in a cargo area.

BACKGROUND

Cargo containers may be used to transport packages and goods on a number of different types of vehicles, such as, for example, planes, trucks, trains, ships, and barges. For example, cargo containers referred to as "unit load devices" or "ULDs," may be used to transport packages and goods aboard cargo aircraft. Such cargo containers may be efficiently loaded and unloaded from a cargo aircraft. Prior to loading, or after unloading, the cargo containers may be received in cargo areas having respective cargo decks. Some cargo decks have rollers supported by the cargo deck, with the rollers facilitating movement of the cargo containers within the cargo area. In particular, the lower surface of the cargo container is supported by the rollers, which facilitate movement of the containers across the cargo deck by cargo handlers, who simply push the containers across the rollers.

In some cargo operations, the packages and goods are loaded or unloaded from the containers while the containers remain on the cargo deck. Because the rollers facilitate movement of the containers across the deck, the containers may feel unstable while the cargo handlers load and unload the containers, or as the cargo handlers step into or out of the containers. This instability of the cargo containers may lead to inefficiencies in loading and unloading the containers, for example, as other handlers attempt to stabilize the cargo containers while a first handler loads or unloads the cargo from the container, or steps into or from the container.

Attempts have been made to provide devices to prevent unintended movement of the containers on the cargo deck. However, previous attempts may suffer from a number of drawbacks, such as, for example, an inability to sufficiently stabilize the containers, or relatively complex, expensive, or inefficient installations, such as the use of tie-downs, etc. The desire for rapid loading and unloading of containers results in complex arrangements being impractical.

Thus, it may be desirable to provide a system and method for limiting the movement of cargo containers in a cargo area during loading and unloading of the containers. Further, it may be desirable for such systems and methods to be relatively simple, quickly deployable, and/or effective for stabilizing the cargo containers on the cargo deck.

SUMMARY

One aspect of the disclosure relates to an immobilizing device for limiting movement of a cargo container in a cargo area. The device may include a tubular member configured to be inserted into an aperture of a cargo deck. The tubular member may have a hollow interior configured to receive a portion of the cargo deck located in the aperture. The immobilizing device may further include a stop member extending at least partially across the hollow interior of the tubular member, wherein the stop member is configured such that extension of the tubular member into the aperture is limited by contact between the stop member and the portion of the cargo deck located in the aperture. The immobilizing device may also include an extension associated with the tubular member and configured to engage a lower edge of the cargo container, such that the immobilizing device limits movement of the cargo container upon receipt of the tubular member in the aperture and engagement between the extension and the lower edge of the cargo container.

Another aspect relates to a system for limiting movement of a cargo container in a cargo area. The system may include a cargo deck associated with a cargo area and configured to facilitate movement of a cargo container on the cargo deck. The cargo deck may include an upper planar surface, and apertures in the upper planar surface, wherein the apertures define a recess in the cargo deck. The cargo deck may further include rollers supported in the recesses, such that a portion of the rollers extends above the upper planar surface to support a cargo container. The rollers may be configured facilitate movement of the cargo containers across the cargo deck. The system may further include an immobilizing device configured to limit movement of the cargo container on the cargo deck. The immobilizing device may include a tubular member configured to be inserted into one of the apertures of the upper planar surface. The tubular member may have a hollow interior configured to receive at least a portion of one of the rollers, and a stop member extending at least partially across the hollow interior of the tubular member. The stop member may be configured such that extension of the tubular member into the aperture is limited by contact between the stop member and the roller located in the aperture. The immobilizing device may further include an extension associated with the tubular member and configured to engage a lower edge of the cargo container, such that the immobilizing device limits movement of the cargo container upon receipt of the tubular member in the aperture and engagement between the extension and the lower edge of the cargo container.

A further aspect relates to a method for selectively limiting movement of a cargo container on a cargo deck. The method may include inserting an immobilizing device into an aperture of the cargo deck located adjacent a cargo container. The immobilizing device may include a tubular member configured to be inserted into an aperture of the cargo deck. The tubular member may have a hollow interior configured to receive a portion of the cargo deck located in the aperture. The immobilizing device may further include an extension associated with the tubular member and configured to engage a lower edge of the cargo container, such that the device limits movement of the cargo container upon receipt of the tubular member in the aperture and engagement between the extension and the lower edge of the cargo container. Inserting the immobilizing device into the aperture may include inserting the tubular member into the aperture such that the extension engages the lower edge of the cargo container.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosed devices, systems, and methods and together with the description, serve to explain the principles of the disclosed devices, systems, and methods.

DESCRIPTION OF EXEMPLARY EMBODIMENTS

Reference will now be made in detail to exemplary embodiments.

Figure 1:
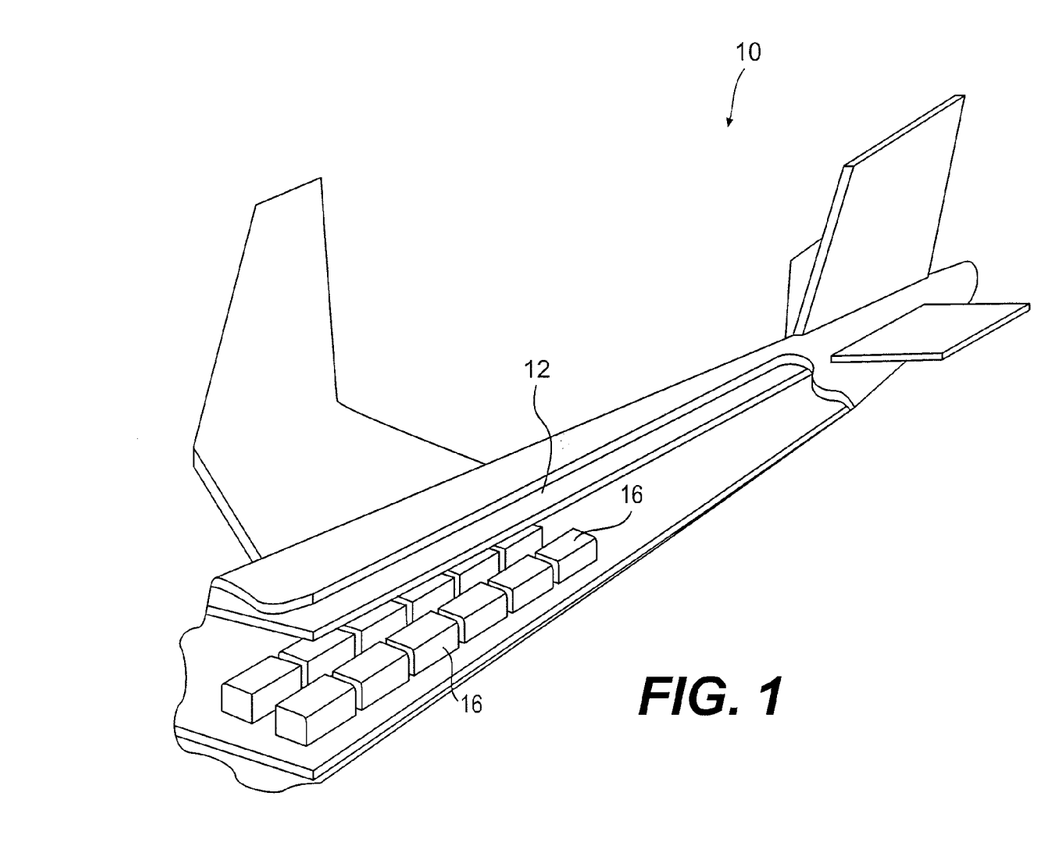
FIG. 1 is a cutaway view of an exemplary embodiment of a cargo vehicle having an exemplary cargo area.
Figure 2:
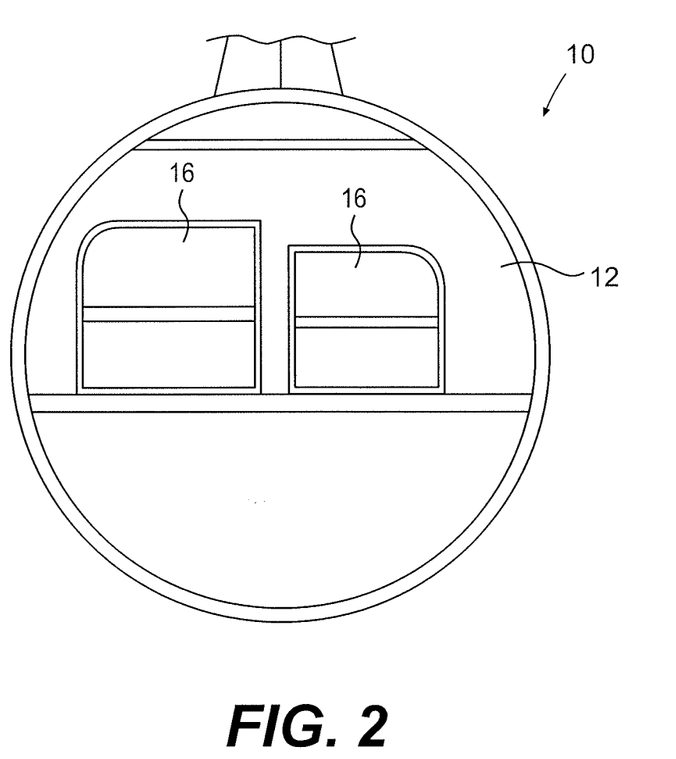
FIG. 2 is a cross-sectional view of an exemplary embodiment of a cargo vehicle having an exemplary cargo area.

FIG. 1 shows an exemplary embodiment of a cargo vehicle 10 having a cargo area 12. In particular, the exemplary cargo vehicle shown is a cargo aircraft, although other types of cargo vehicles are contemplated, such as, for example, trains, trucks, ships, and barges. As shown in FIGS. 1 and 2, cargo area 12 contains a number of cargo containers 16 for facilitating loading, transporting, and unloading packages and goods from cargo vehicle 10. Cargo containers 16 may include any known cargo container types, such as, for example, any known sizes and configurations of unit load devices or ULDs.

Figure 3:
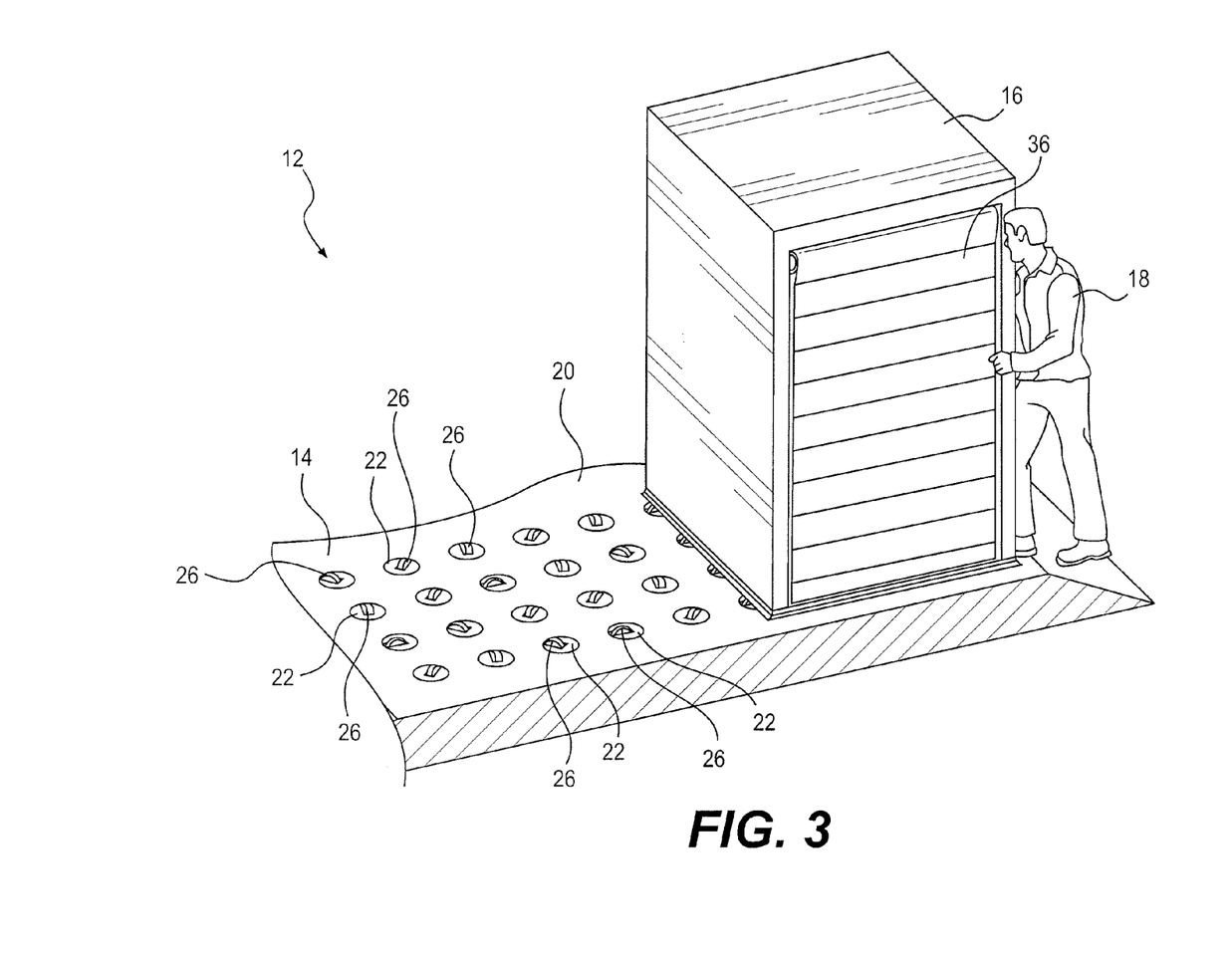
FIG. 3 is a schematic view of an exemplary cargo area, through which an exemplary cargo container is being moved across an exemplary cargo deck.

FIG. 3 shows an exemplary embodiment of a cargo deck 14 of an exemplary cargo area 12. Cargo area 12 may be located in any cargo handling facility, such as, for example, a cargo facility at an airport or cargo vehicle terminal. Exemplary cargo deck 14 shown in FIG. 3 is configured to facilitate movement of cargo containers 16 on cargo deck 14. For example, according to some embodiments, cargo containers 16 may be pushed across cargo deck 14, for example, by a cargo handler 18. For example, cargo deck 14 may include an upper surface 20, which may be substantially planar. Cargo deck 14 may also include a plurality of apertures 22 in upper surface 20, with apertures 22 defining recesses 24 (see FIG. 4) in cargo deck 14.

Figure 4:
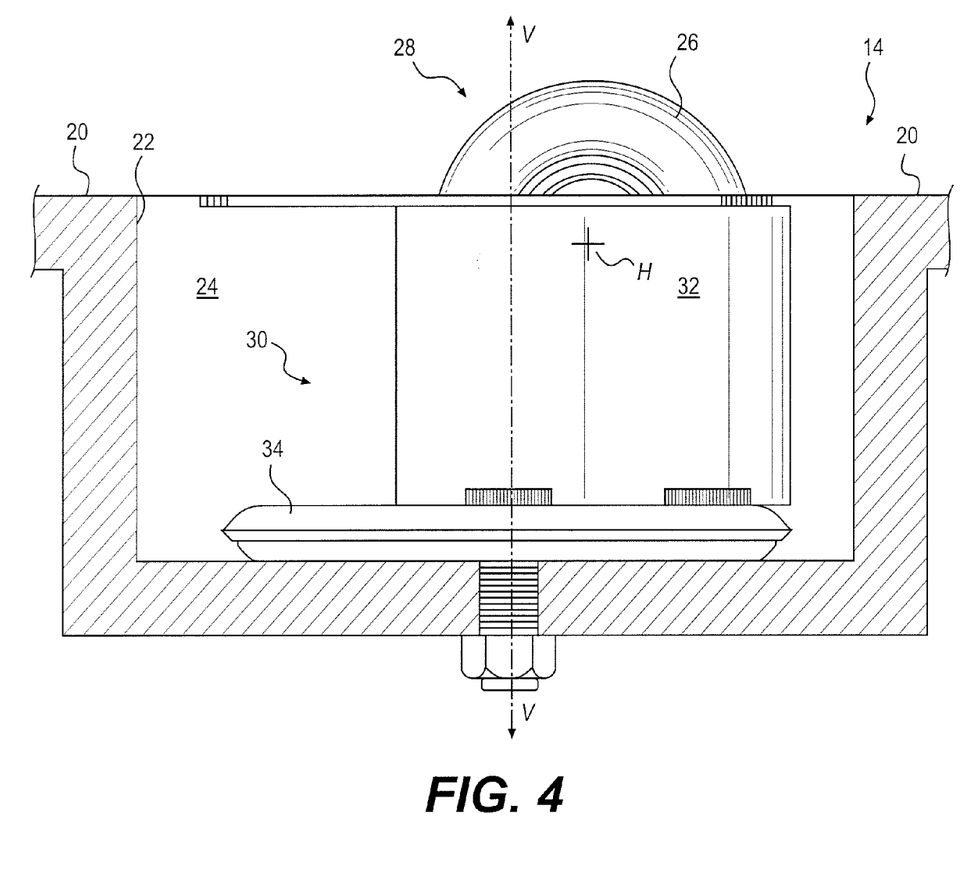
FIG. 4 is a partial section view of a portion of an exemplary cargo deck.

As shown in FIGS. 3 and 4, exemplary cargo deck 14 includes rollers 26 configured to facilitate movement of cargo containers 16 across cargo deck 14. For example, exemplary rollers 26 are received and supported in recesses 24, such that a portion 28 (i.e., an upper extent) of rollers 26 protrudes above upper surface 20 of cargo deck 14. As shown in FIG. 4, rollers 26 may be supported by a swivel assembly 30 configured to facilitate rotation of rollers 26 about a substantially vertical axis V and about a substantially horizontal axis H. In the exemplary embodiment shown in FIG. 4, rollers 26 are supported by a frame 32 supported by a bearing assembly 34 configured to permit frame 32 to rotate about vertical axis V. According to the exemplary embodiment shown, rollers 26 are in the form of wheels. Other types of rollers are contemplated, such as, for example, balls.

In the exemplary embodiment shown, exemplary rollers 26 support cargo containers 16. Because rollers 26 are able to rotate about both vertical axis V and horizontal axis H, one or more cargo handlers 18 are able to push cargo containers 16 across cargo deck 14.

As shown in FIG. 3, at least some of cargo containers 16 may include a door 36 for permitting access to the interior of cargo container 16. For example, when loading and unloading cargo container 16, door 36 may be opened and handler 18 may enter the interior of cargo container 16 to load and unload cargo container 16.

For example, packages and goods may be loaded or unloaded from cargo containers 16 while cargo containers 16 remain on cargo deck 14. Because rollers 26 of cargo deck 14 facilitate movement of cargo containers 16 across cargo deck 14, cargo containers 16 may feel unstable to handlers 18 in the interior of cargo containers 16 while loading and unloading cargo containers, or as handlers 18 step into or out of cargo containers 16. For example, cargo containers 16 may rock or move across cargo deck 14 in an unintended manner. This instability of cargo containers 16 may lead to inefficiencies in loading and unloading, for example, as one or more other handlers 18 attempt to stabilize cargo containers 16, while a first handler 18 loads or unloads the packages and goods from cargo container 16, or steps into or from cargo container 16.

Figure 5:
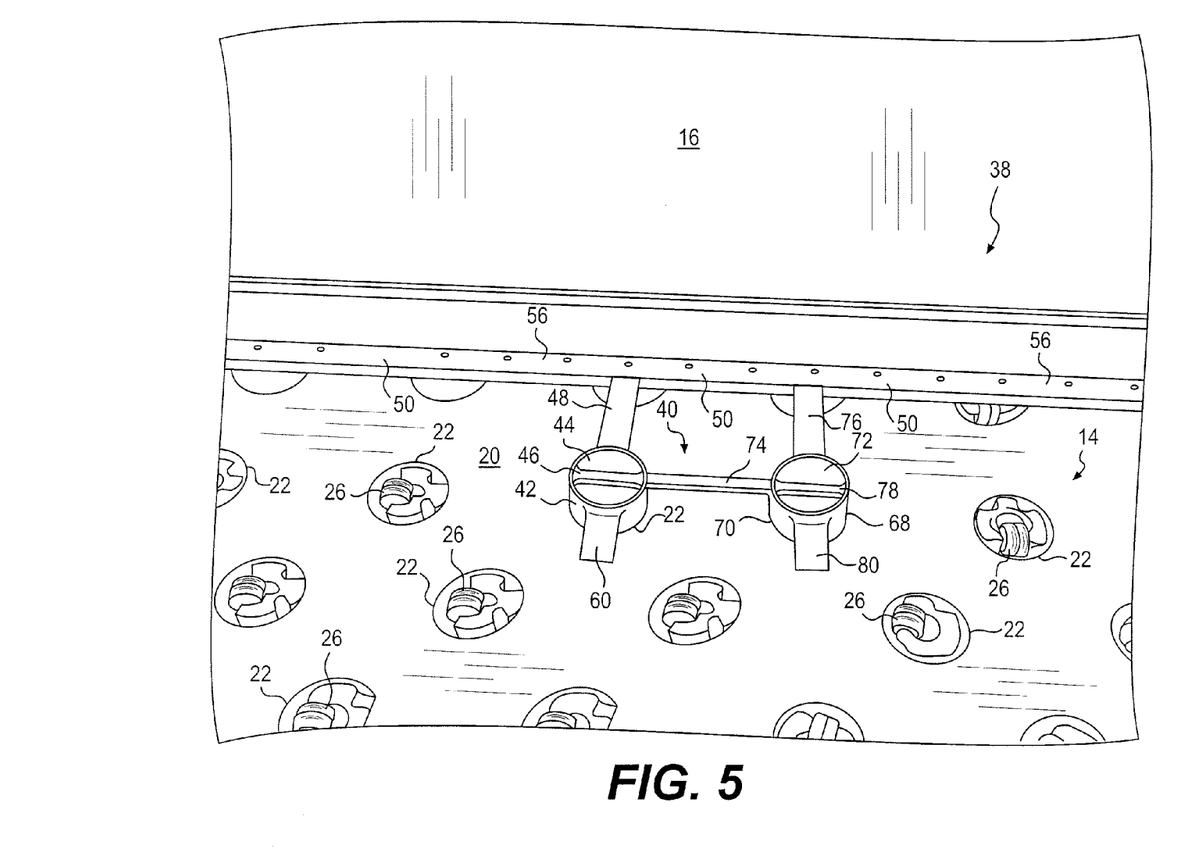
FIG. 5 is a perspective view of an exemplary embodiment of an immobilizing device for limiting movement of a cargo container in a cargo area.

As shown in FIG. 5, a system 38 may be provided for limiting movement of cargo containers 16 in a cargo area 12. As shown, system 38 may include a cargo deck 14, for example, as described previously herein. System 38 may further include an immobilizing device 40 configured to limit movement of cargo container 16 on cargo deck 14 of cargo area 12, such as the exemplary embodiment shown in FIGS. 5 and 6. Immobilizing device 40 may be formed from any suitable materials having sufficient strength, such as, for example, steel, aluminum, cast iron, titanium, high-strength plastic, and/or carbon fiber or similar materials.

Figure 6:
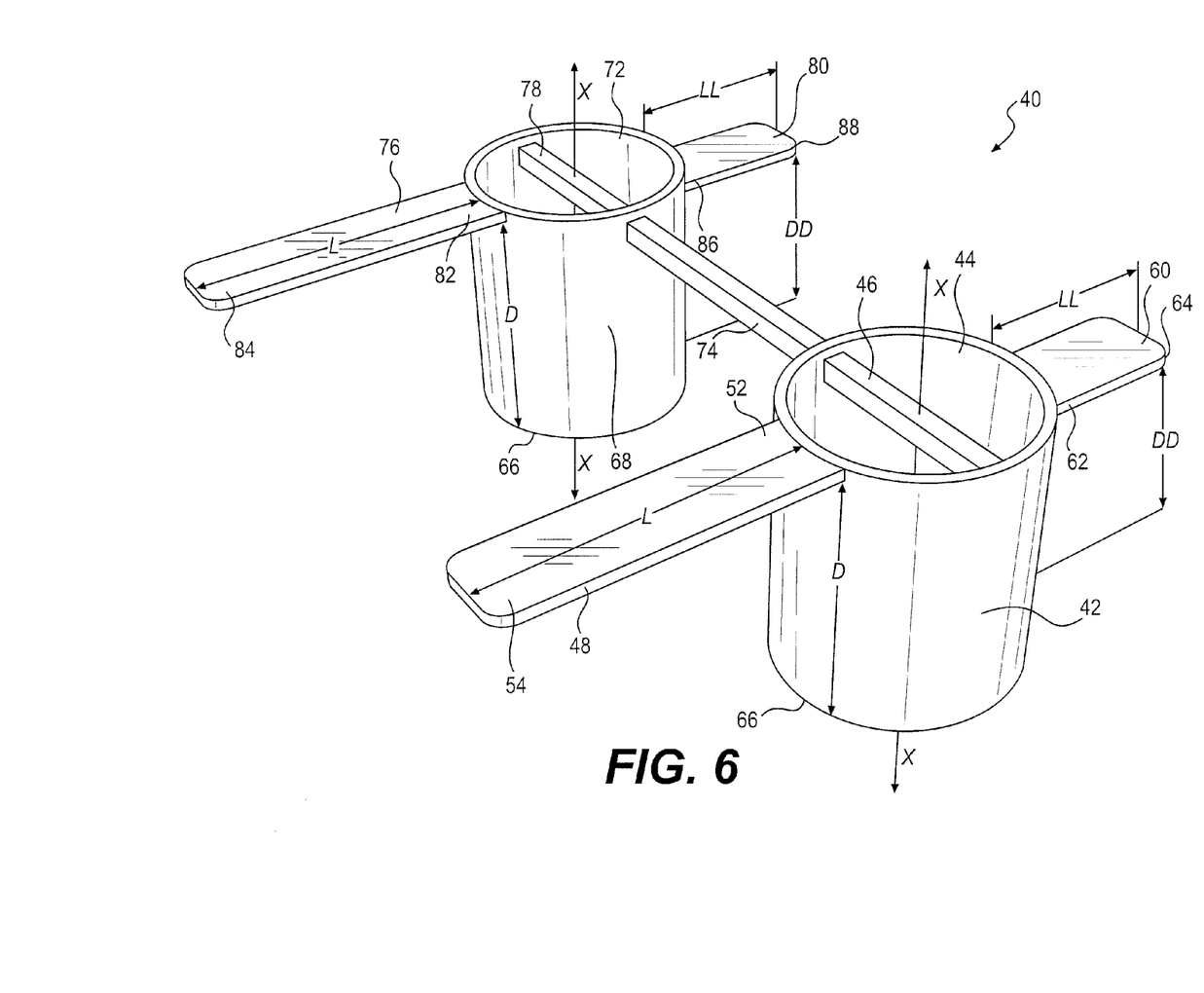
FIG. 6 is a perspective view of the exemplary embodiment shown in FIG. 5 being used in an exemplary manner to immobilize a cargo container on a cargo deck.
Figure 7:
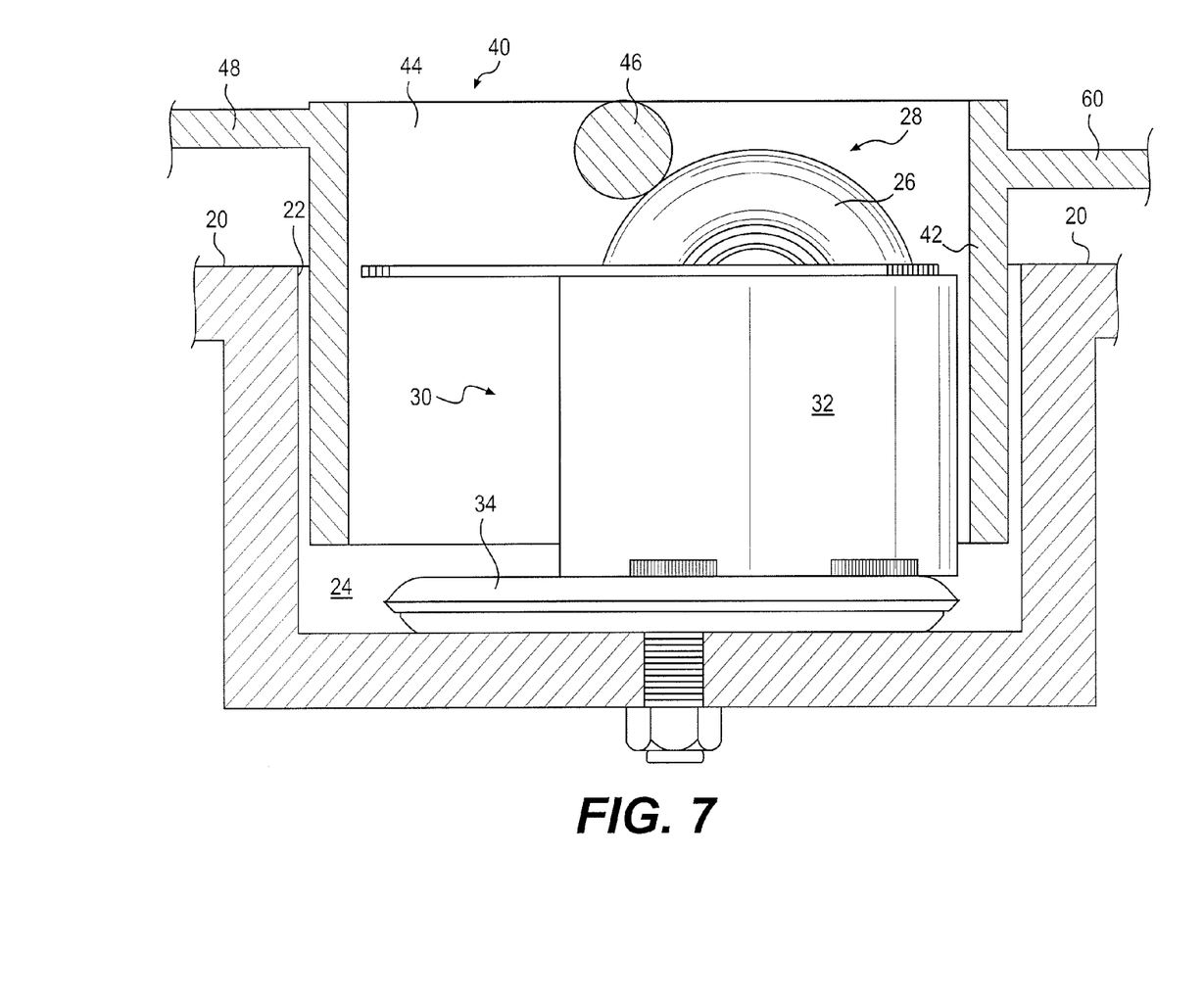
FIG. 7 is a section view of a portion of an exemplary immobilizing device engaged with a portion of an exemplary cargo deck.

For example, as shown in FIGS. 6 and 7, immobilizing device 40 may include a tubular member 42 configured to be inserted into aperture 22 of cargo deck 14. Tubular member 42 may have a hollow interior 44 configured to receive portion 28 of cargo deck 14 located in aperture 22. Apertures 22 have a cross-sectional shape, and tubular member 42 may have a cross-sectional shape perpendicular to longitudinal axis X configured to fit within the cross-sectional shape of apertures 22. For example, the cross-sectional shapes of apertures 22 and tubular member 42 may be one of substantially circular, substantially oval-shaped, and substantially polygonal.

Immobilizing device 40 may further include a stop member 46 extending at least partially across hollow interior 44 of tubular member 42. Stop member 46 may be configured such that extension of tubular member 42 into aperture 22 is limited by contact between stop member 46 and portion 28 of cargo deck 14. According to some embodiments, immobilizing device 40 may further include an extension 48 associated with tubular member 42 and configured to engage a lower edge 50 of cargo container 16, such that immobilizing device 40 limits movement of cargo container 16 upon receipt of tubular member 42 in aperture 22 and engagement between extension 48 and lower edge 50 of cargo container 16, for example, as shown in FIGS. 5 and 7.

As shown in FIG. 6, exemplary tubular member 42 of immobilizing device 40 has a longitudinal axis X, and exemplary extension 48 is coupled to tubular member 42, such that extension 48 extends substantially perpendicular to longitudinal axis X. According to some embodiments, extension 48 may extend transverse to tubular member 42 without being substantially perpendicular to longitudinal axis X.

In the exemplary embodiment shown in FIG. 6, extension 48 includes a first end 52 coupled to tubular member 42 and a second end 54 remote from tubular member 42. Second end 54 of extension 48 is configured to engage lower edge 50 of cargo container 16 (see FIG. 5). For example, lower edge 50 may include a flange 56, and second end 54 of extension 48 may include a substantially planar surface 58 configured to engage flange 56 to thereby limit movement of cargo container 16 on cargo deck 14.

In the exemplary embodiment shown in FIG. 6, extension 48 is a first extension extending in a first direction relative to tubular member 42 (e.g., in a first direction substantially perpendicular to longitudinal axis X). As shown, exemplary immobilizing device 40 includes a second extension 60 coupled to tubular member 42 and extending in a second direction different than the first direction relative to tubular member 42. For example, the first direction is substantially opposite the second direction as shown in FIG. 6. It is contemplated that the first direction and the second direction may not necessarily be opposite one another.

As shown in FIG. 6, first extension 48 has a length L from first end 52 to second end 54, and second extension 60 has a length LL extending from a corresponding first end 62 to a second end 64 of second extension 60. In addition, first extension 48 may be coupled to tubular member 42 at a distance D from the lower edge 66 of tubular member 42 that is greater than a distance DD from lower edge 66 at which second extension 60 is coupled to tubular member 42, for example, as shown in FIG. 6.

The differences in lengths of the extensions and/or the differences in distances from lower edge 66 at which the extensions are mounted may provide the ability to use immobilizing device in various orientations and with cargo containers of different configurations. In addition, the exemplary embodiment of immobilizing device 40 shown in FIG. 6 may be placed between two adjacent cargo containers 16, such that first extension 48 engages a lower edge 50 of a first one of the two cargo containers 16, and second extension 60 engages a lower edge 50 of a second one of the two cargo containers 16, thereby helping to limit movement of two adjacent cargo containers.

In the exemplary embodiment shown in FIGS. 5 and 6, tubular member 42 is a first tubular member and extension 48 is a first extension. This exemplary embodiment of immobilizing device 40 further includes a second tubular member 68 configured to be inserted into a second aperture 70 of cargo deck 14 (FIG. 5). Second tubular member 68 includes a hollow interior 72 configured to receive a second portion 28 of cargo deck 14 located in second aperture 70. Second tubular member 68 has a cross-sectional shape, and the cross-sectional shape may be one of substantially circular, substantially oval-shaped, and substantially polygonal.

Exemplary immobilizing device 40 further includes a coupling member 74 configured to couple first tubular member 42 to second tubular member 68. According to some embodiments, coupling member 74 is a fixed length. According some embodiments, coupling member 74 may have an adjustable length, so immobilizing device 40 may be used on cargo decks having apertures spaced apart by different distances.

Immobilizing device 40 may also include a third extension 76 coupled to second tubular member 68 and configured to engage lower edge 50 of cargo container 16. For example, third extension 76 extends in a third direction substantially the same as the first direction in which first extension 48 extends. It is contemplated that the first direction and the third direction may not necessarily be the same direction.

As shown in FIGS. 5 and 6, exemplary immobilizing device 40 further includes a second stop member 78 extending at least partially across hollow interior 72 of second tubular member 68. Second stop member 78 is configured such that extension of second tubular member 68 into second aperture 70 is limited by contact between second stop member 78 and portion 28 of cargo deck 14 located in second aperture 70, similar to the manner in which first stop member 46 of first tubular member 42 extends into first aperture 22.

The exemplary embodiment shown in FIGS. 5 and 6 also includes a fourth extension 80 coupled to second tubular member 68, with fourth extension 80 extending in a fourth direction different than the third direction in which third extension 76 extends relative to second tubular member 68. For example, the fourth direction may be substantially opposite the third direction as shown, although the fourth direction may not necessarily be opposite the third direction.

As shown in FIG. 6, third extension 76 has a length L from a first end 82 to a second end 84, and fourth extension 80 has a length LL extending from a corresponding first end 86 to a second end 88 of fourth extension 60. In addition, third extension 76 may be coupled to second tubular member 68 at a distance D from lower edge 66 of second tubular member 68 that is greater than a distance DD from lower edge 66 at which fourth extension 80 is coupled to second tubular member 68. Although the exemplary combination of second tubular member 68, third extension 76, and fourth extension 80 are shown as a mirror-image of the exemplary combination of first tubular member 42, first extension 48, and second extension 60, other configurations are contemplated such that they are not necessarily mirror-images of one another.

The provision of the combination of second tubular member 68, third extension 76, and fourth extension 80 to the combination of first tubular member 42, first extension 48, and second extension 60, may improve the effectiveness of the immobilizing device 40 in limiting movement of cargo containers 16. For example, such an embodiment may result in a more secure engagement between cargo deck 14 and immobilizing device 40. In addition, such an embodiment may result in a more secure engagement between first extension 48 and third extension 76 and a lower edge of a first cargo container, and/or between second extension 60 and fourth extension 80 and a lower edge of a second cargo container.

Figure 8:
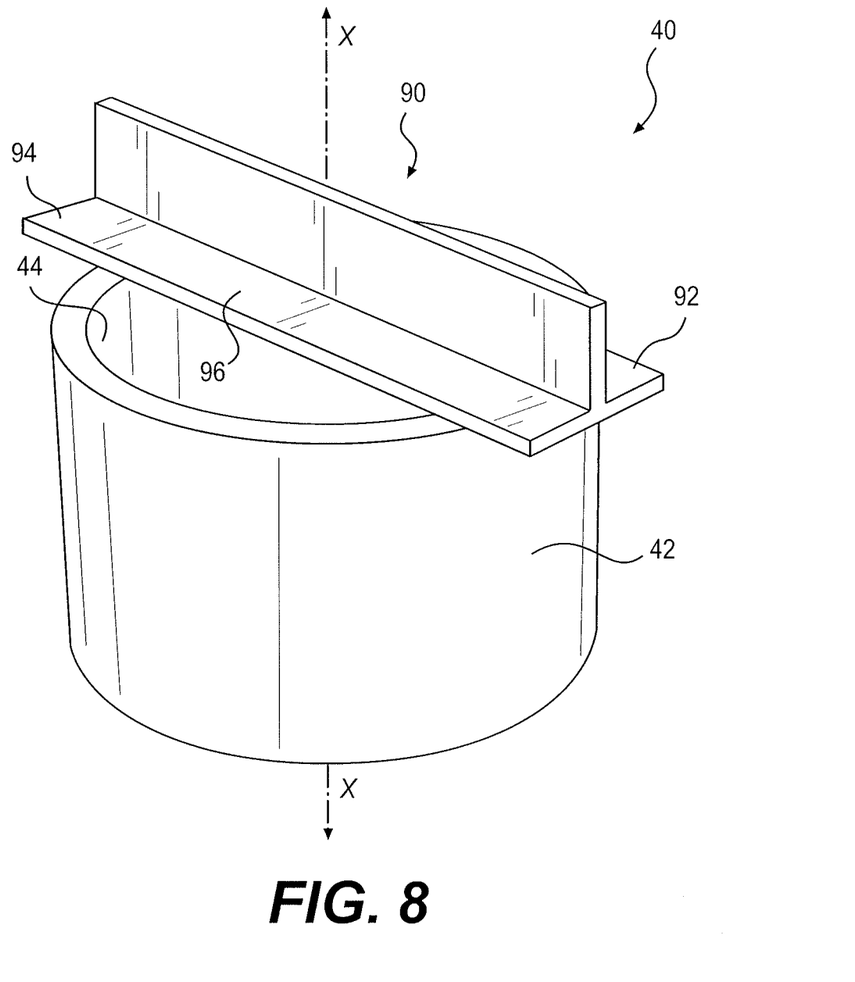
FIG. 8 is a perspective view of another exemplary embodiment of an immobilizing device.

The exemplary embodiment of immobilizing device 40 shown in FIG. 8 includes extensions formed by a cross-member 90 coupled at one end of tubular member 42. In the exemplary embodiment shown, cross-member 90 includes a first extension 92, a second extension 94, and a stop member 96 between first extension 92 and second extension 94, wherein stop member 96 forms a portion of cross-member 90. For example, first extension 92 extends in a first direction, second extension 94 extends in a second direction, and stop member 96 is between first extension 92 and second extension 94. In the embodiment shown, the first and second directions are substantially opposite one another, but the first and second directions may have other orientations relative to one another. In the exemplary embodiment shown, cross-member 90 is an inverted T-section. Cross-members having other cross-sectional shapes are contemplated. Tubular member 42 has a cross-sectional shape perpendicular to longitudinal axis X, and the cross-sectional shape may be one of substantially circular, substantially oval-shaped, and substantially polygonal.

In the exemplary embodiment shown in FIG. 8, tubular member 42 is configured to be inserted into aperture 22 of cargo deck 14, and first and/or second extensions 92 and 94 are configured to engage lower edges of respective, adjacent cargo containers 16. For example, exemplary immobilizing device 40 shown in FIG. 8 may be placed between rows of adjacent cargo containers 16, with extensions 92 and 94 engaging the lower edges of two adjacent cargo containers 16.

Figure 9:
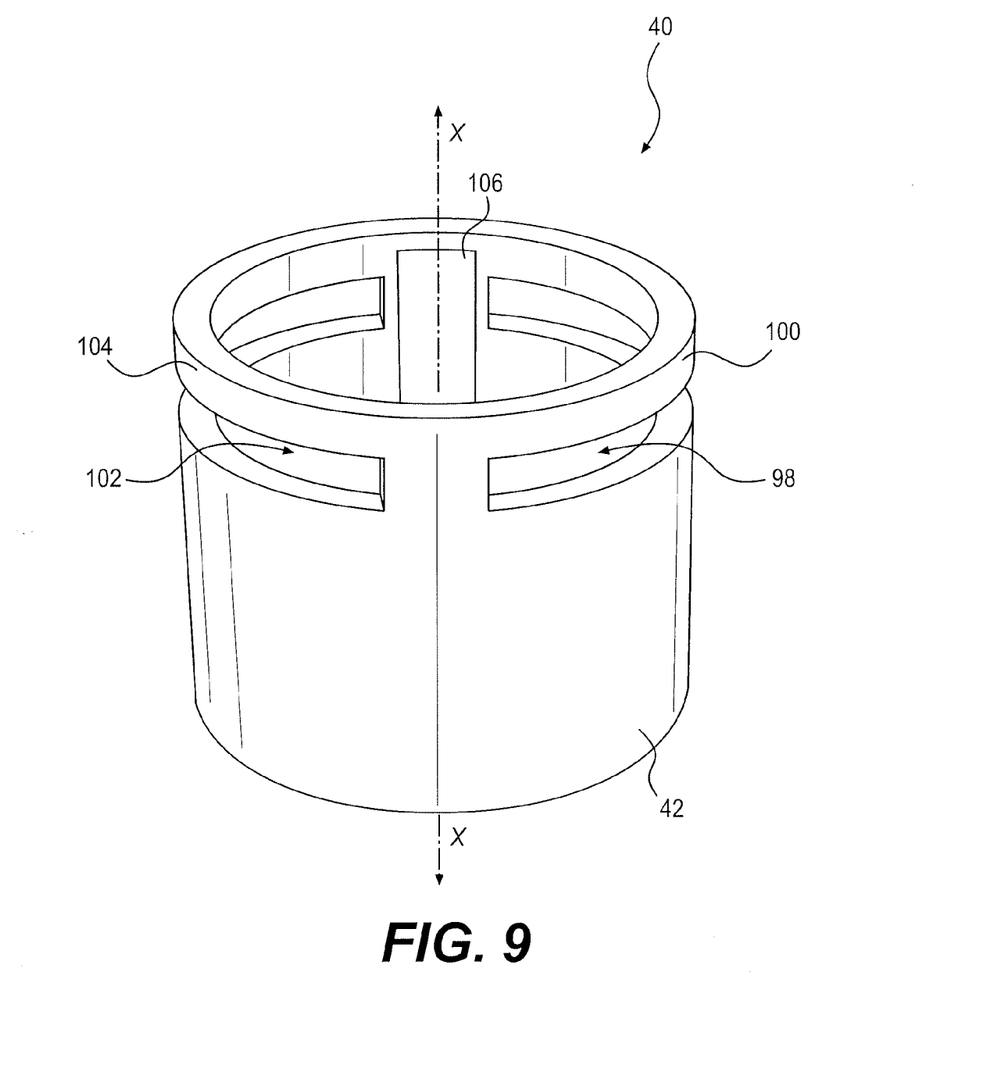
FIG. 9 is a perspective view of another exemplary embodiment of an immobilizing device.

In the exemplary embodiment of immobilizing device 40 shown in FIG. 9, tubular member 42 has a first recess 98 at least partially defining a first extension 100. Exemplary tubular member 42 also has a second recess 102 defining a second extension 104, although it is contemplated that tubular member 42 may include only a single recess defining a single extension. As shown, first extension 100 and second extension 104 extend in opposite directions, although it is contemplated that first and second extensions 100 and 104 may extend in other orientations relative to one another. Tubular member 42 has a cross-sectional shape perpendicular to longitudinal axis X, and the cross-sectional shape may be one of substantially circular, substantially oval-shaped, and substantially polygonal.

According to some embodiments, immobilizing device 40 shown in FIG. 9 includes a stop member 106, for example, similar to stop members 46 and 78 shown in FIG. 6. In addition to limiting insertion of tubular member 42 into apertures 22, stop member 106 may provide structural support and/or facilitate handling of immobilizing device 40 by handlers 18.

In the exemplary embodiment shown in FIG. 9, tubular member 42 is configured to be inserted into an aperture 22 of cargo deck 14, and first and/or second extensions 100 and 104 are configured to engage a lower edge of a cargo container. For example, exemplary immobilizing device 40 shown in FIG. 9 may be placed between rows of adjacent cargo containers 16, with extensions 100 and 104 engaging the lower edges of two adjacent cargo containers 16.

A method for selectively limiting movement of a cargo container on a cargo deck may, according to some embodiments, include inserting an immobilizing device into one or more apertures of the cargo deck located adjacent a cargo container, such that one or more tubular members of the immobilizing device fit into one or more apertures of the cargo deck. The immobilizing device may include any configurations described herein, and insertion of the one or more tubular members may be performed, such that one or more extensions engage a lower edge of the cargo container. According to some embodiments, the method may further include inserting a second immobilizing device into one or more second apertures adjacent the cargo container, such that one or more of the tubular members of the second immobilizing device fit into the one or more apertures, and the one or more extensions of the second immobilizing device engage the lower edge of the cargo container.

According to some embodiments, the immobilizing device may include one or more first extensions and one or more second extensions, and the method may include inserting the immobilizing device into one or more apertures in the cargo deck, so that the one or more first extensions engage the lower edge of a first cargo container, and the one or more second extensions engage the lower edge of a second cargo container. This may facilitate limiting movement of two adjacent cargo containers, for example, in a row of adjacent cargo containers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An immobilizing device for limiting movement of a cargo container in a cargo area, the device comprising:
    a tubular member configured to be inserted into an aperture of a cargo deck, the tubular member having a hollow interior configured to receive a portion of the cargo deck located in the aperture;
    a stop member extending at least partially across the hollow interior of the tubular member, wherein the stop member is configured such that extension of the tubular member into the aperture is limited by contact between the stop member and the portion of the cargo deck located in the aperture; and
    an extension associated with the tubular member and configured to engage a lower edge of the cargo container, such that the device limits movement of the cargo container upon receipt of the tubular member in the aperture and engagement between the extension and the lower edge of the cargo container.

2. The device of claim 1, wherein the tubular member has a longitudinal axis, and the extension is associated with the tubular member such that it extends substantially perpendicular to the longitudinal axis of the tubular member.

3. The device of claim 2, wherein the extension has a first end coupled to the tubular member and a second end remote from the tubular member, wherein the second end is configured to engage the lower edge of the cargo container.

4. The device of claim 3, wherein the second end includes a substantially planar surface configured to engage a flange of the lower edge of the cargo container.

5. The device of claim 3, wherein the extension is a first extension extending in a first direction relative to the tubular member, and wherein the device further comprises a second extension coupled to the tubular member, the second extension extending in a second direction different than the first direction relative to the tubular member.

6. The device of claim 5, wherein the first direction is substantially opposite the second direction.

7. The device of claim 5, wherein the first extension has a first length, and the second extension has a second length different than the first length.

8. The device of claim 3, wherein the tubular member is a first tubular member and the extension is a first extension, wherein the device further comprises:
    a second tubular member configured to be inserted into a second aperture of the cargo deck, the second tubular member having a hollow interior configured to receive a portion of the cargo deck located in the second aperture;
    a coupling member configured to couple the first tubular member to the second tubular member; and
    a second extension associated with the second tubular member and configured to engage the lower edge of the cargo container.

9. The device of claim 8, further comprising a second stop member extending at least partially across the hollow interior of the second tubular member, wherein the second stop member is configured such that extension of the second tubular member into the second aperture is limited by contact between the second stop member and the portion of the cargo deck located in the second aperture.

10. The device of claim 8, wherein at least one of the first extension and the second extension extends in a first direction relative to the respective tubular member, and wherein the device further comprises a third extension coupled to the first tubular member, the third extension extending in a second direction different than the first direction relative to the first tubular member.

11. The device of claim 10, wherein the first direction is substantially opposite the second direction.

12. The device of claim 10, wherein the first extension has a first length, and the second extension has a second length different than the first length.

13. The device of claim 10, further comprising a fourth extension coupled to the second tubular member, the fourth extension extending in a second direction different than the first direction relative to the second tubular member.

14. The device of claim 1, wherein the extension comprises a cross-member coupled at one end of the tubular member, and the stop member is a portion of the cross-member.

15. The device of claim 14, wherein the extension comprises a first extension extending in a first direction and a second extension extending in a second direction, and the stop member is between the first extension and the second extension.

16. The device of claim 15, wherein the first direction and second direction are opposite one another.

17. The device of claim 1, wherein the tubular member has a recess, and wherein the recess at least partially defines the extension.

18. The device of claim 17, wherein recess is a first recess and the tubular member has a second recess defining a second extension.

19. The device of claim 1, wherein the tubular member has a cross-sectional shape, and wherein the cross-sectional shape is one of substantially circular, substantially oval-shaped, and substantially polygonal.

* * * * *